INVENTORS.
Jack E. Callender,
Gerald E. Bosler,
By Brown, Jackson, Boettcher & Dienner
Att'ys.

March 3, 1959 J. E. CALLENDER ET AL 2,876,292

SWITCHING APPARATUS AND ARRANGEMENTS FOR AUTOMATIC TELEPHONE SYSTEMS

Filed March 22, 1952 4 Sheets-Sheet 2

INVENTORS.
Jack E. Callender,
Gerald E. Basler,
By Brown, Jackson, Boettcher & Dienner
Att'ys.

March 3, 1959 J. E. CALLENDER ET AL 2,876,292

SWITCHING APPARATUS AND ARRANGEMENTS FOR AUTOMATIC TELEPHONE SYSTEMS

Filed March 22, 1952 4 Sheets-Sheet 3

INVENTORS.
Jack E. Callender,
Gerald E. Bosler,
By Brown, Jackson, Boettcher & Dienner
Attys.

March 3, 1959 J. E. CALLENDER ET AL 2,876,292

SWITCHING APPARATUS AND ARRANGEMENTS FOR AUTOMATIC TELEPHONE SYSTEMS

Filed March 22, 1952 4 Sheets-Sheet 4

INVENTORS.
JACK E. CALLENDER
GERALD E. BOSLER
BY Brown, Jackson, Boettcher & Dienner
ATTYS.

United States Patent Office 2,876,292

Patented Mar. 3, 1959

2,876,292

SWITCHING APPARATUS AND ARRANGEMENTS FOR AUTOMATIC TELEPHONE SYSTEMS

Jack E. Callender and Gerald E. Bosler, Galion, Ohio, assignors to North Electric Company, a corporation of Ohio Application March 22, 1952, Serial No. 278,034

21 Claims. (Cl. 179—27.5)

The present invention relates to novel switching apparatus, and more particularly to a novel switch member which is adapted for use in automatic telephone exchanges.

The relay of the present invention is especially adapted for use in industrial applications involving the simultaneous extension of a large number of circuits, and especially to the alternative extension of several large groups of circuits over a single predetermined path. Conversely, the relay has utility in the extension of a single given group of circuits over several alternative groups of paths. The specific utility of and the need for such apparatus in the various industrial fields, and especially in the telephony field, has long been recognized and the present invention is directed to equipment which answers that need.

There has been in recent years a definite move in the telephony field toward the reduction of overall exchange costs, major reductions having been effected recently by the more extensive use of common control equipment and the provision of a somewhat more compact and orderly layout of the equipment on the exchange frameworks. The use of common control equipment, while successfully effecting substantial savings in the cost of switching equipment which is utilized in the establishment of a call and is released prior to completion of the call for use by other subscribers, is not in itself the complete answer to the problem. For example, the switching equipment in a conventional exchange which is held during a call, such as the line circuits, line switches, etc., has normally been somewhat space consuming, bulky and costly, and since such equipment constitutes a substantial portion of the exchange equipment, the provision of common control arrangement is only a partial answer to the cost reduction problem. There is a definite need for improved switching apparatus which will successfully perform the duties of this conventional equipment, and which additionally is much more compact in structure and less costly in manufacture than the known types of switching apparatus. It is to the provision of such equipment that the present invention is directed.

In automatic telephone equipment of the all-relay type, the establishment of a connection between a calling and called subscriber is based upon the concept of extending line groups of diminishing size toward the point where the actual connection with the desired one of the subscribers is made. One of the switches used in such operation is known as a line finder switch and is conventionally used to service one hundred subscribers. A line finder switch basically comprises a group of ten "tens" relays and a group of ten "units" relays interconnected so as to automatically select the subscriber substation for connection to the exchange as a call is initiated by the substation. The selection of this one line from one hundred lines is made by first selecting the group of ten lines in which the substation is connected and thereafter selecting the calling one of the lines from the selected group.

Since each tens relays must be operative to extend ten subscriber lines (normally 3 wires per line) and the like lines of each group must be multiplied to assigned units relays, it is readily appreciated that a line finder switch is by nature somewhat bulky and normally requires a comparatively large amount of mounting space. Since an automatic telephone exchange serving 1,000 subscribers will require as many as 150 to 200 line finder switches, it is apparent that the housing problem therefor becomes somewhat serious. Additionally the bulky dimensions of the switches result in the dispersal of the individual relays thereof over unduly large separated areas and the cost involved in effecting the multiple connection of the widely dispersed relays in a conventional switching arrangement becomes extremely great, such cost frequently constituting a major portion of the expense involved in the manufacture and installation of an exchange.

It is a primary object of the invention to provide a novel relay which is extremely compact in structure and economical in cost, and specifically which occupies the mounting space of a relay of the conventional type and is arranged to perform the operations of two such conventional relays.

A specific object of the invention is to provide a relay of this desirable compact structure which is reliable and dependable in its operation and extremely sturdy in structure. It is a further object of the invention to provide a relay having the aforementioned characteristic which is comparatively simplex in its arrangement and which utilizes a minimum of operating members arranged in a manner which reduces the wear and deterioration of the switch in use to a minimum.

A feature of the invention is the manner in which this latter object is accomplished by providing reed circuit carrying members mounted in cantilever fashion in three substantially parallel spaced large banks, the reeds of each bank being arranged for simultaneous operation in a given movement of an associated multi-armature relay structure. The utilization of banks of cantilever mounted reeds provides a relay in which contact overtravel is provided and each one of the contacts as operated into a circuit completing position is held thereat in a firm positive manner.

A further feature of the relay is the manner in which one bank of this switch is rendered common to a plurality of other banks (whereby the circuits connected to said common bank may be alternatively connected over the contacts of any of the other banks on the relay structure), and the manner in which this common bank is rendered movable (rather than stationary) to provide overtravel in the engagement thereof with any of the other banks.

These and other novel features briefly characteristic of the invention will become apparent with reference to the following specification and claims when taken in connection with the accompanying drawings in which:

As demonstrated in Figure 1 especially, our relay 10 therein includes a pair of relay electromagnet coils 11 and 12, a pair of rockingly mounted armatures 13 and 14, each adapted for attraction by one of the coils 11 or 12 to move one of three banks of contact reeds 15, 16 and 17 into circuit closing engagement with an adjacent bank of the contact reeds for selectively energizing relay circuits therethrough as will be described more fully hereinafter.

Figures 1, 7, 8:
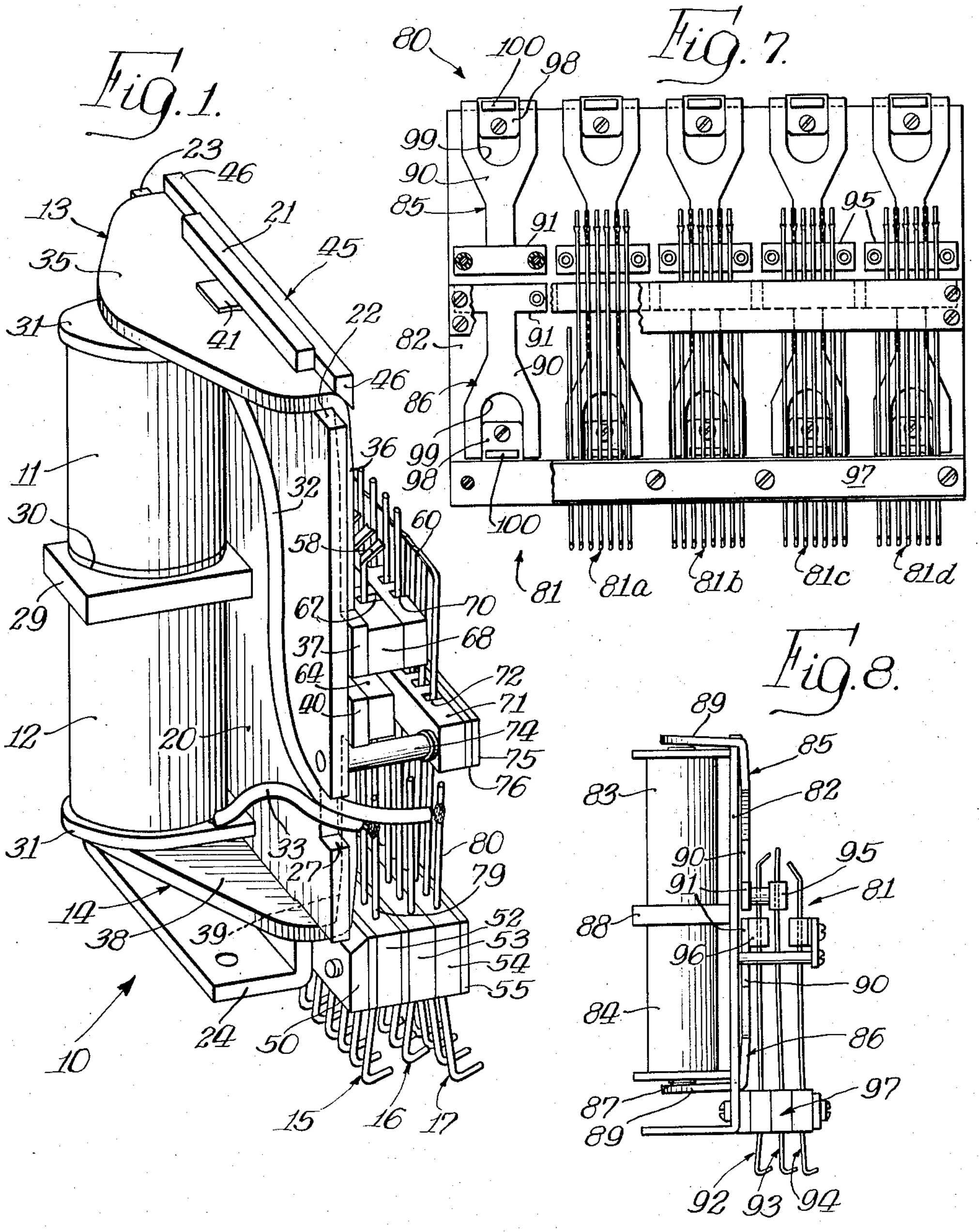
Figure 1 is a perspective view of a relay structure made in accordance with the teachings of our invention.
Figure 7 is a front elevational view, with parts thereof broken away, showing the features of our invention embodied in an alternate gang style relay structure.
Figure 8 is an end elevational view of the relay structure of Figure 7.
Figures 2, 3:
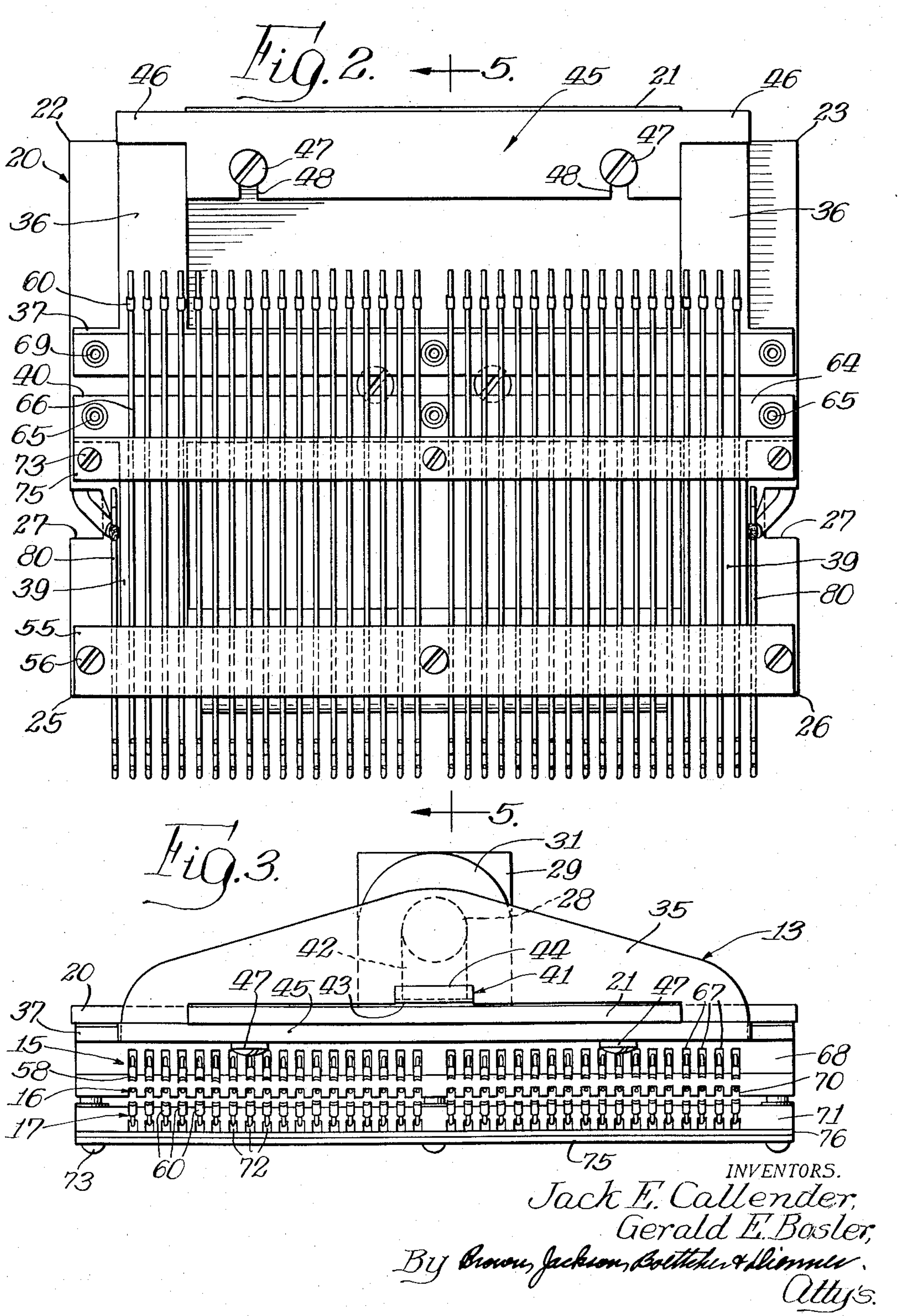
Figure 2 is a front elevational view of the relay structure of our present invention as shown in Figure 1.
Figure 3 is a top plan view of the relay structure shown in Figure 1.
Figures 4, 5, 6:
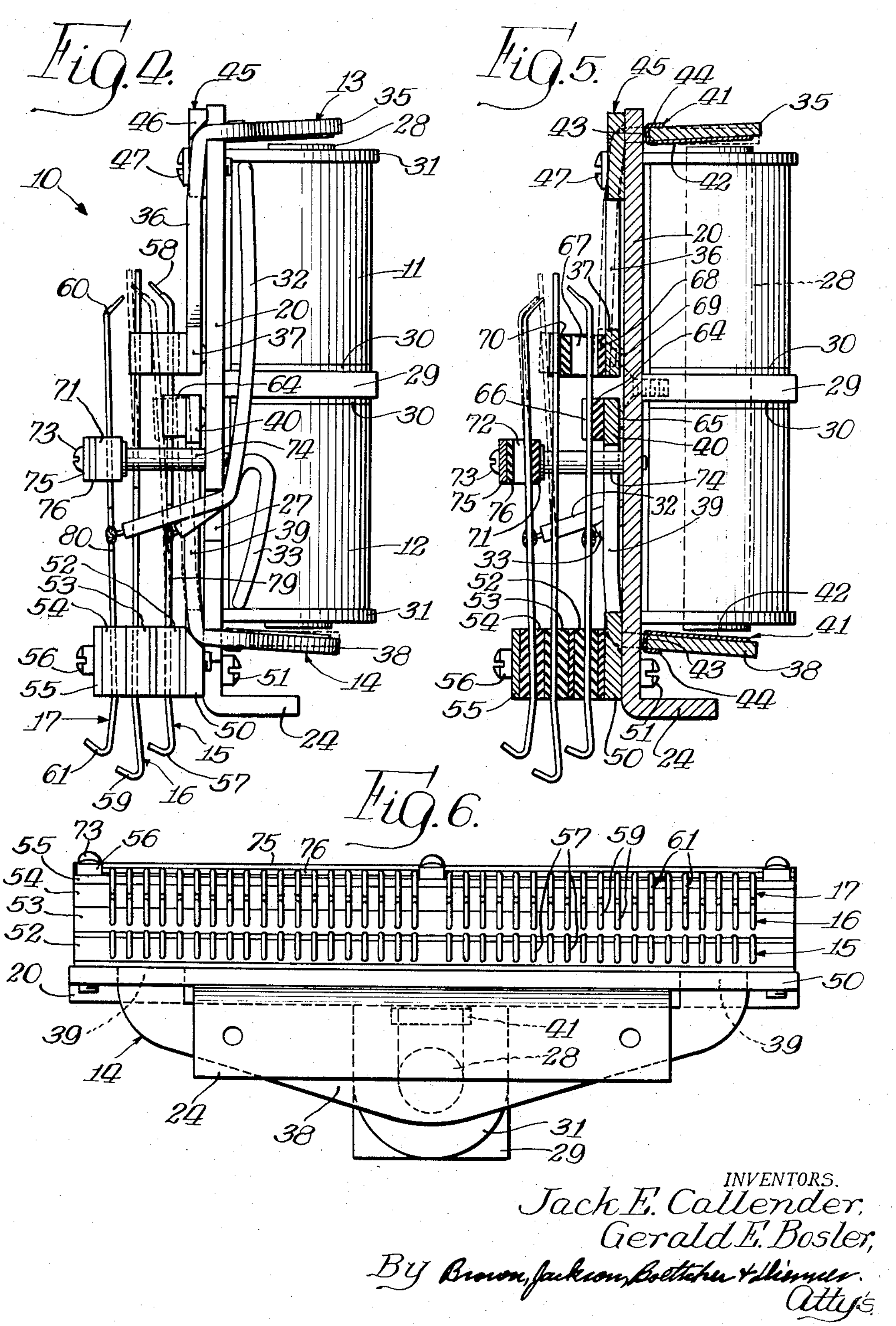
Figure 4 is a side elevational view of the relay structure shown in Figures 1–3, demonstrating the operative and inoperative positions of several of the parts thereof.
Figure 5 is a cross sectional view taken substantially along lines 5—5 of Figure 2 and looking in the direction of the arrows therein.
Figure 6 is a bottom plan view similar to Figure 3, showing the arrangement of elements as they appear when looking upwardly at the bottom of our relay.

It will be observed from Figures 1–6 of the drawings that our relay 10 comprises a platelike frame member 20 of a substantially rectangular configuration, as illustrated in particular in Figure 2 of the drawings. Frame member 20 is distinguished at its upper end by an extending tongue portion 21 formed by cutting out a rectangular area adjacent each of the upper corners 22 and 23 thereof. Frame 20 further includes a transversely positioned mounting lip 24 at its lower end, which is formed somewhat similar to the formation of the tongue portion, 21, by cutting away rectangular areas adjacent the lower corners 25 and 26 of the frame plate, but then turning the thus formed extending portion of the plate (intermediate the cutout lower corners) transversely of the plane of the frame member, substantially as illustrated in Figures 3 and 4. The frame plate is further provided with a pair of substantially rectangular notches 27, 27 disposed on opposite lateral edges thereof and intermediate its vertical extremities, as shown in particular in Figure 2 of the drawings. As will be recognized, the relay frame member 20 is adapted to support the working elements of the relay thereon in a manner to be amplified later herein, such plate element preferably being made of cold rolled steel of approximately 1/8" thickness.

Mounted in a vertical upright position centrally of and closely adjacent to the rearward face of the frame plate 20, are the upper and lower relay coil members 11 and 12, respectively. It should be noted at this time that the descriptive terms "vertical" and "horizontal" are used in a relative manner and are not to be construed as limitations. In the field, for example, the relays are normally mounted as shown in Figure 6. These coils are identical as to number of turns and are supported coaxially, in tandem one above the other, on a common core member 28, as shown in Figures 3 and 4 in particular. The two coil members 11 and 12 are also separated at their adjacent ends by a magnetic shunt member 29 comprising a rectangular plate of a suitable magnetic material, such as cold rolled steel or iron. Each of the coil members is separated from the shunt plate by an insulating disc 30 made of a suitable fibrous non-conductive material. The opposite or upper and lower ends of the two assembled relay coils also are provided with like insulating end plates 31, 31 and pairs of circuit connective leads 32 and 33 are soldered to the windings of each of the coils adjacent these insulating end plates.

Mounted for rocking actuation about the upper and lower ends of the frame plate, are the upper and lower magnetic armature members 13 and 14 respectively. The two armature members are similar in configuration and are most easily formed by a suitable stamping operation. It will be observed from Figures 1, 2, and 3 of the drawings, that the upper armature member 13 includes a substantially elongated triangular platform portion 35, from the opposite base ends of which depend a pair of separated arm portions 36, 36. These arm portions 36, 36 are further interconnected, at their lower reaches, by an integrally associated cross bar portion 37, the platform, arms and bar portions of the upper armature bar being preferably stamped as an integral unit from a single plate of ferromagnetic material. The lower armature 14 is likewise provided with a triangular platform portion 38, a pair of transversely related separated arm portions 39, 39 and a cross connecting bar portion 40.

Each of the armature members is further provided with a residual member 41 mounted on the platform portion thereof to guard against the armatures and adjacent ends of the magnetic coil core member 28 remaining in the operated position due to residual magnetism. The residual members 41 are each preferably formed of thin Phosphor bronze sheeting, or a like material, and comprise an elongated finger portion 42 bent over at one end in two right angular bends to form an end wall portion 43 and a platform portion 44, as illustrated clearly in Figures 4 and 5 of the drawings. It will be noted that one clip member is attached to the platform portion of each of the two armature members and, as shown in Figures 3–6, such residual members are disposed centrally of the platform portions of their associated armature members with the enlongated finger portion thereof lying adjacent the inside face of the armature platform portion for preventing the platform portion from making contact with the adjacent end of core 28.

As stated heretofore, each of the armature members is mounted for rocking actuation about one of the ends of the frame plate. Specifically, the upper armature member 13 is received over the upwardly extending tongue portion 21 of the frame plate so that such tongue portion extends intermediate the armature's arm portions 36, 36. A non-magnetic clamp plate 45, preferably made of brass or bronze is mounted adjacent the front face of the frame plate, as illustrated clearly in Figures 1 and 2 of the drawings. It will be noted that the clamp plate 45 is provided with reduced finger portions 46, 46 at its opposite ends, which are chamfered angularly along their lower edges to permit close fitting positioning of such finger portions with the armature 13 adjacent the bend interconnecting the arm and platform portions thereof. The clamp plate thus acts as a means for holding the upper armature to the frame plate. Also set screws 47, 47 are received in suitable slotted apertures 48 in the clamp plate member for tightly holding such in a position to lock the armature for rocking actuation about the upper edge of the frame plate 20 as illustrated.

In its mounted position over the upper end of the frame plate, the upper armature member has the apex end of its triangular platform portion extending over the upper end of core member 28 with the Phosphor bronze residual member 41 mounted thereon to guard against sticking of the platform against the adjacent end of the core member.

The lower armature member 14 is likewise supported for rocking actuation about the lower end of the frame plate and this armature member is also held for rocking actuation about the lower end of the frame plate. It will be noted that the extended mounting lip 24 of the lower armature is received between the separated arm portions 39, 39 of the lower armature similar to the mounting of the upper armature member over the tongue portion 21. It will also be noted that a second or lower clamp plate 50 is furnished to hold the lower armature member in its mounted position on the frame plate. Set screws 51 are received through the frame plate and threadingly received in the lower clamp plate 14 to tightly hold the latter member in its mounted position adjacent the frame plate, thereby to accomplish the pivotal connection and supporting of the lower armature member on the frame plate.

Mounted to the lower clamp plate are a plurality, herein shown as three in number, of reed supporting block numbers 52, 53 and 54 made of a suitable insulating material, such as Bakelite. The three reed supporting block members are mounted adjacent one another to form a composite block formation which is suitably secured rigidly to the outer face of the lower clamp plate 50 by means of an outer bearing plate 55 and a plurality of threaded bolt members 56 which thread into the lower clamp plate, as best shown in Figures 4 and 5. It will be appreciated that each of the reed supporting block members is provided with a plurality of symmetrically spaced cylindrical openings for the tight fitting reception therein of a bank of electrically conductive reed members. The inner and intermediate blocks 52 and 53 respectively, are provided with substantially vertically aligned openings in contrast to the outer block 54 which is provided wtih angularly disposed openings. Individual reeds, of the inner bank of contact reeds 15, intermediate reed bank members 16, and outer reed bank members 17, are thus mounted in their respective block members 52, 53 and 54.

The inner reed members 15 comprise lengths of copper wire which are turned over at their lower ends to form circuit connective terminals 57 thereon. The upper end of each of the inner reed members is also suitably turned over at an angular disposition and flattened, as best shown in Figure 3, to form contactors 58 for engaging the intermediate reed members 16, as will appear presently. The intermediate reed members are also formed of substantially straight lengths of copper wire with the lower ends thereof being turned over as on the inner reed members to form connective terminal lower ends 59 thereon.

The outer reed members 17 are formed substantially similar to the inner reed members with the exception that the flattened contactor upper ends 60 thereof are turned inwardly toward the intermediate reed members, or in an opposite direction to contactors 58 of the inner reed members. The lower ends of the outer reed members are also turned over, like the inner and intermediate reed members, to form terminal connectors 61 thereon. Further, it will be recognized that due to the angular disposition of the mounting openings in the outer block member 54, the bank of outer reed members is disposed at a somewhat angular disposition as related to the substantially vertical, parallel alignment of the inner and intermediate banks of reeds.

Although the alignment of the various openings in the several block members 52, 53 and 54 and their rigid association with the lower clamp plate and frame plate members provides an adequate support for maintaining the several banks of reed members in a desired upwardly projecting and spaced relation immediately in front of the frame plate, it is also necessary that the reeds be further aligned and supported above the block members, since the reeds are to be moved arcuately relative to one another in operating our relay. In particular, the bank of inner reeds 15 are moved relative the intermediate reeds 16 to close one set of relay circuits therethrough. Likewise, the bank of intermediate reed members 16 are moved relative to the outer reed members 17 to perform a second circuit closing function with the latter.

To provide the needed intermediate support during the movement of the inner reeds as a bank, the lower armature member 14 is provided with an insulating first comb block 64 mounted coextensively with the cross connecting bar portion 40 thereof. Comb block 64 is suitably riveted with brass rivets to the bar portion 40 with the inner ends of the rivets 65 being turned over intermediate the adjacent faces of the armature's bar portion and the frame plate so as to provide a convenient residual spacing means therebetween which guards against sticking due to residual magnetism. The comb block member 64 is provided further with a plurality of rectangular slotted openings 66 each of which is adapted to nest one of inner reed members 15 therein. It further will be observed that the splotted openings 66 of the comb block member 64 recess inwardly from the outer face thereof so as to space and insulate the inner reeds from the metal cross bar portion 40 of armature 14.

The upper ends of the inner reed elements 15 are also received through internal, rectangular, slotted apertures 67 formed in a second rectangular comb block 68 which is supported on the cross bar portion 37 of the upper armature member 13. Connection of the second comb block 68 to its associated armature cross bar portion 37 is made by means of brass rivet members 69, the inner head ends of which serve as residual spacing means between the bar portion 37 and the adjacent face of the frame plate to guard against sticking due to residual magnetism. In addition to apertures 67, the upper comb block member 68 is also provided with a plurality of vertical slotted apertures 70 which extend inwardly from its outer face, similar to the construction employed in the lower comb block 64, described above. These slotted apertures 70 receive and space the upper ends of the intermediate reed elements 16.

The outer reed elements 17 are suitably supported in their banked relation by a third comb block 71 which is provided with a plurality of spaced rectangular apertures 72, similar to the apertures 67 of the second comb block 68.

The third comb block 71 is further securely fastened in parallel spaced relation in front of the frame plate 20 by means of bolt members 73 which carry coaxial hollow spacers 74 positioned between the comb block and the frame plate. A metal bearing plate 75 is also used to protect the insulating material of the comb block 71 from the head ends of the bolt members, and a thin sheet of insulating material 76 is used to separate the third comb block from the bearing plate.

It will be noted that the last reed element at each end of the three banks of reeds is cut off just above its associated supporting block as at 52, 53 and 54. The inner and outer cut off reeds 79 and 80 respectively serve as connective terminals for soldered connection with the conductors 32 and 33 associated with the two coil members, such conductors being led through the cut out openings 27 of the frame plate for convenience. While other means may be employed for the circuit connection of the two coil members, it has been found convenient to provide the terminal connection as we have illustrated herein thus to simplify the electrical hook-up for our relay.

In operation, as observed in Figure 4 of the drawings in particular, magnetic attraction of the lower armature upon energization of lower coil member 12 causes the arm and cross connecting bar portions of the lower armature to move arcuately away from the frame plate to assume their dotted line position of Figure 4. This action of course permits the comb block 64 associated with the inner reeds 15 to pick up or move the inner reed elements therewith toward the bank of intermediate reed elements 16 and bring the contactor ends 58 of the inner reed elements into circuit closing engagements with the adjacent upper ends of the intermediate reed elements. It will also be observed that such a circuit closing action between the inner and intermediate reed elements results in a slight resilient bending of the intermediate reed elements toward the outer reeds 17 which we will define as "follow." However, this bending of the intermediate reed elements is not sufficient to move the intermediate reeds into contact with the outer reed elements as will further be observed from the dotted line operating position showing of the intermediate reed elements of Fig. 4.

Conversely, magnetic attraction of the upper armature 13 upon electrical energization of the upper relay coil member 11 causes the open face comb portion of the block member 68 connected to the upper armature, to force the intermediate reed elements 16 into circuit closing contact with the contactor ends 60 of the outer reed elements 17 as demonstrated by the dotted line showing of Figure 5 of the drawings. During this operation, it will be appreciated that the inner reeds are not moved by the upper armature in moving the intermediate reeds into contact with the outer bank of reeds due to the lost motion relationship between the comb block 68 on the upper armature and the inner bank of reeds 15 provided by the elongated slotted openings 67.

It is also noted that the contact moving structure is mounted to provide a follow of the contact reeds subsequent to movement thereof into circuit making relation, this follow being provided for each of the circuit completing reed arrangements on the switch. Such arrangement minimizes bounce during contact closure and insures the provision of a firm, positive contacting relation between the circuit completion members.

Turning now to the embodiment of our invention as demonstrated in Figures 7 and 8 of the drawings, we have therein adapted the general features and teachings of our relay 10, as heretofore described, to a gang-type relay structure indicated generally by numeral 80.

In particular, it will be appreciated that the relay structure 80 includes a plurality of relays, herein five individual or separate relays numbered 81, 81*a*, 81*b*, 81*c*, and 81*d*, each constructed according to the features of our first described relay 10 and all supported on a common frame plate 82. For convenience we shall herein describe the features of the individual relay 81 of this modified gang-type structure 80, since the other individual relays are identical therewith.

Relay 81 includes a pair of electromagnetic coils 83 and 84, termed herein upper and lower coils, respectively; upper and lower armatures 85 and 86, respectively, mounted vertically alongside the frame plate 82 for pivotal movement thereabout in response to magnetic attraction to the coils 83 and 84; and common core member 87 mounting the coils which are separated by an intermediate magnetic shunt plate 88, as in our previously described relay 10. Each armature comprises a platform portion 89, an elongated arm portion 90 related at right angles to the platform portion and a cross bar portion 91, positioned transversely at the free end of the arm portion thereof, substantially as in our relay 10 of Figure 1. Of course, it will be appreciated that the material from which the armatures are constructed is of a suitable ferro-magnetic material or the like.

Banks of contact reeds 92, 93 and 94 are mounted in insulated relation as before, in front of the frame plate and armature arm and cross bar portions. Insulated comb blocks 95 and 96 are carried by the cross bar portion 91 of the upper and lower armatures 85 and 86 respectively, for moving the inner and intermediate banks of reeds 92 and 93 into circuit closing contact with adjacent reeds, as described herebefore for our relay 10. A lower insulating block assembly 97 rigidly holds the lower ends of the several reeds to separate the individual reeds and align them in banked relationship substantially as illustrated.

By and large it may be stated that each of the individual relays of the complete or composite structure 80 of Figures 7 and 8, is essentially identical to our first described relay structure 10 with exception being taken as to the configuration of the individual armature members thereof and the modified mounting of such armature members for pivotal actuation about the frame plate 82. In this last respect, it will be noted that the upper armature platform portion 89 is received over the upper edge of the frame plate and that a small clip 98 is then fastened to the frame plate in an opening 99 which bifurcates the armature's arm portion 90 adjacent its upper end. A rectangular lip extension 100 of the armature platform portion 89 invades a matching opening therefor provided in the clip member 98 to provide the hinging connection between the upper armature and the frame plate.

The lower armature 86 is likewise pivotally attached to the frame plate 82 by means of a clip 99 in a manner as described immediately hereabove, with the exception that the platform portion 89 of the lower armature member extends through the frame plate instead of leading or projecting over an edge thereof.

With the two armature members mounted for pivotal actuation about the frame plate in this manner, electrical energization of the electromagnetic relay coils 83 and 84 causes magnetic attraction of the adjacent ends of the armature platform portions to the common core member 87. Such magnetic attraction between the adjacent ends of the armature platform portions and the electromagnetic core member of course results in rocking actuation of the armature affected about its pivot point, thereby to thrust the cross bar portion 91 thereof outwardly or arcuately away from the frame plate to carry the bank of contact reed members associated therewith toward an adjacent bank of reeds in completing circuit closing connection therethrough. Specifically, it will be appreciated that outward movement of the upper armature in this manner from the frame plate causes the intermediate bank of reeds 93 to close contact with the outer bank of reeds 94. Similar pivotal actuation of the lower armature member causes the inner bank of reeds 92 to make circuit closing contacts with the upper ends of the reeds of intermediate bank 93, all in a manner similar to that heretofore described for our relay 10.

It will thus be appreciated that the assembly or relay construction 80, described hereabove and illustrated in Figures 7 and 8 of the drawings, provides a convenient and compact arrangement whereby several individual relays, each identified or associated with an individual circuit or set of circuits can be secured to a single mounting panel or frame plate for independent operation in a manner similar to that ascribed to our first relay 10, of Figures 1 through 6 of the drawing.

The use of an actuating member based on the lever arm principle to operate reed members which are mounted in cantilever fashion, and for "follow" operation when moved into circuit closing relation, provides an arrangement in each of the foregoing relays in which positive and reliable contact engagement is accomplished. In one commercial embodiment a contact pressure in the order of 20 grams was consistently effected with contact engagement. The mounting of the reed banks for "follow" upon contact engagement provides an arrangement in which a minimum of contact bounce is experienced and which is inherently a shock proof structure. A few of the specific arrangements in which the novel relays of the invention are readily utilized are now set forth hereat.

It should be noted that suitable residual pins and plates are incorporated in the structure 80 corresponding to those shown in relay 10.

*Specific application*

The relays of the invention are particularly adapted for use in industrial applications in which a large number of circuits are to be simultaneously completed, and particularly in arrangements where one large group of circuits are to be completed over several alternative paths. One advantageous application of the switches in an automatic telephone exchange is set forth hereat for exemplary purposes, it being believed that the utility of the switches in other industrial and telephony applications is obvious therefrom.

In automatic telephone equipment of the all relay type, it is a common practice to select one large group of lines from a plurality of groups of lines and to extend the group of lines thus selected over a series of predetermined paths for selection of a line from such group.

For example, a line finder switch in a conventional telephone exchange will normally have access to one hundred subscribers' lines and is operative with initiation of a call by one of the hundred subscribers to select the particular group of ten subscribers of which it is a member, and thereafter the particular units group to which it belongs. With selection of the line, the line finder effects the extension thereof to further selecting equipment. An all-relay line finder switch of this general type is set forth schematically in a copending application which was filed March 24, 1952 by Arne Oxaal and received Serial No. 278,242 and was assigned to the assignee of this invention.

As set forth therein each one hundred subscriber lines are divided respectively into groups of ten, the groups thus formed being connected to the contacts of ten so-called "tens" relays (F10, F20, F30, etc. to F00). The ten relays operate one at a time and each is energized only when a line belonging to its assigned group and having a corresponding tens digit initiates a call. Thus, when the calling subscriber is in the group from 11 to 10, the finder tens relay F10 is operated, when the calling subscriber is in the group from 21 to 20 the finder tens relay F20 will operate, etc. When any one of these ten "tens" relays is operated, it serves to extend the associated ten subscriber lines to a group of units relays which are identified as F1, F2, etc. to F00. The relay contacts on a tens relay F10, F20 etc. which extend to the first subscriber of its group of ten subscribers, i. e. 11, 21, 31, etc. are multipled together and connected to the contacts of the first units relay F1. Likewise the relay contacts on the tens relays F10, F20, etc. which extend to the second subscriber of its group of ten are multipled together and extend to the second units relay F2 etc.

With this arrangement it will be seen that with the operation of one tens relay and one units relay in the line finder circuit, one line of the hundred lines in the group is extended to the further switching equipment without in any way disturbing any of the other ninety-nine lines in the link. For example, if subscriber 11 initiates a call, the tens relay F10 will be energized to extend the ten subscriber lines 11, 12, etc. to 10 to the multiples leading to the contacts of the ten units relays F1–F0. Inasmuch as only the units relay F1 is operated responsive to initiation of a call by subscriber 11, only line 11 will be connected over the outgoing conductors to the exchange switching equipment.

This system of extending line groups of diminishing sizes toward a point at which the actual connection is made is fundamental in an all relay system and renders extremely practical the use of the novel group-extending relays of the present disclosure.

Figure 9:
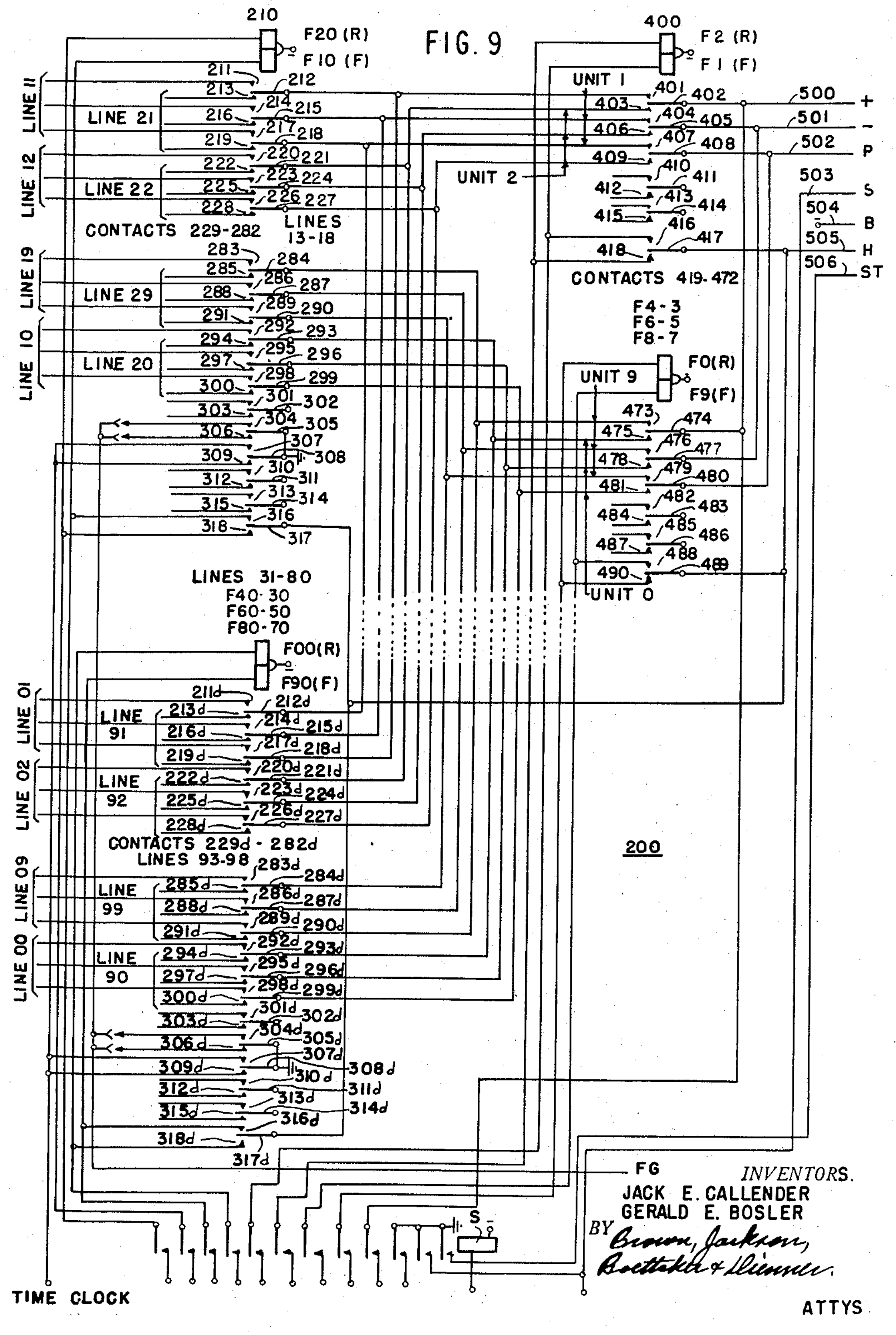
Figure 9 is a schematic sketch of a line finder switch for an automatic telephone exchange utilizing the relays of the invention.

With reference now to Figure 9, there is shown thereat the manner in which the novel multiple twin-armature relay switches 10 and 80 of the invention are utilized to provide an improved line finder switch 200 for use in an automatic telephone system. The line finder switch 200 is shown somewhat schematically thereat, the nature of the details being variable in accordance with expedients well known in the art. Five twin-armature relay switches 10 of the type set forth in Figures 1 to 6 inclusive, and one relay switch 80 of the type set forth in Figures 7 and 8 are connected as the tens and units relays respectively. The switches may be used in other sections of the line finder switch to similar advantage, as for example in accomplishing grounded line indication and as line relays, these further applications being obvious from the following disclosure.

The five twin armature relays 10 in their connection as the ten "tens" relays of the line finder switch 200 have their first bank of reeds 15 (Fig. 1) connected to the line circuits and substations of a first group of ten subscribers, and the outer bank of reeds 17 connected to the line circuit and substations of a second group of ten subscribers. The contacts of the intermediate bank of reeds 16 are connected to the contacts of the ten "units" relays F1 and F0 in multiple with the like contacts on the other tens relays. Thus with operation of the relay coils F10 or F20 one or the other group of ten subscribers is connected over the intermediate bank 16 to the contacts of the unit relays.

With reference now to Figure 9, it is apparent therefrom that the first relay 10 of the group of five relays, which are connected as the "tens" relays in the switch, is arranged to selectively extend the first and second group of ten subscribers to the units relays F1–F0, the first relay coil F10 controlling the extension of subscriber lines 11—10 thereto and the second relay coil F20 controlling the extension of subscriber lines 21—20 thereto. In a similar manner coil F30 on the second relay switch controls extension of subscriber lines 31—30 to the units relays, and coil F40 controls extension of subscriber lines 41—40; the coil F50 on the third relay switch controls extension of subscriber lines 51—50 and the coil F60 thereon controls the extension of subscriber lines 61—60; coil F70 on the fourth switch controls extension of subscriber lines 71—70 and the coil F80 thereon controls the extension of subscriber lines 81—80; and the coil F90 on the fifth switch controls the extension of subscriber lines 91—90 and the coil 00 controls the extension of subscriber lines 00—01.

The ten coils of switch 80 are connected as the ten units relays of the line finder switch, the coils being identified as F1, F2, F3, F4, F5, F6, F7, F8, F9 and F0 respectively.

The line circuits and substation of each subscriber are connected in sequential order to three given reed contacts of its associated tens relay. That is, line 11 which is the first subscriber of the first group of ten subscriber lines is connected to the first three contacts 211, 214, 217 of outer bank 17 on the first switch F20–F10; line 12 is connected to contacts 220, 223, 226 of the same outer bank 17, etc. Likewise the first line (21) of the second group of ten subscribers is connected to the first three contacts 213, 216 and 219 of the inner bank 15 of the first switch F20–F10; the second line (22) is connected to the next three contacts 222, 225, 228 of bank 15 thereon, etc.

The intermediate bank of contacts 16 of each of the tens relays are connected to the contacts of the units relays, the corresponding contacts of each of the ten relays being multipled together for such connection. That is, the intermediate bank contacts on each tens relays which are associated with the first subscriber of its ten group (i. e. 11, 21, etc.) are multipled to the contacts 401, 404, 407 controlled by the first units relay F1. The contacts which serve lines 11 and 21 on the tens relay F20–F10 in Figure 9 are identified as contacts 212, 215, 218; and the contacts in the tens relay F00–F90 which serve lines 01 and 91 are identified as contacts 212*d*, 215*d*, 218*d*.

The contacts 403, 406, 409 which are controlled by the units relay identified as F2 (the coil for which is mounted on the same core as the coil for units relay F1) are multipled to the intermediate bank contacts, such as 221, 224, 227 of each of the tens relays which are associated with the second subscriber of each group of ten subscribers (i. e. 12, 22, etc.). The remaining contacts of each intermediate bank 16 on each tens relay switch are similarly multipled to the bank contacts controlled by the associate ones of the remaining units relays F3–F0.

The intermediate bank contacts, such as 402, 405 and 408 of the units relays F1–F0 are connected to the conductors extending to a selector or connector link in the automatic telephone exchange.

With this arrangement it is seen that with the operation of a certain tens and units relay in the line finder circuit 200, any line of the hundred lines associated therewith may be extended to the control relays without in any way disturbing any of the other ninety-nine lines. For example, should the subscriber of line 22 desire to extend a call over his associated equipment, his handset is removed in the conventional manner and an associated line circuit will respond to effect operation of the line finder tens and units relays which correspond to the tens and units digit of the calling subscriber's number. In the case of subscriber 22, tens relay F20 and the units relay F2 are operated.

With the operation of the tens relay F20 the inner bank of contacts 15 are moved into circuit making relation with the intermediate bank of contacts 16, whereby the contacts labelled 222, 225, 228 etc. are brought into circuit closing relation with contacts 221, 224, 227 etc. and the lines of the subscribers in line group 21 to 20 are extended to the contacts of the ten units relays F1–F0.

Although each of the lines of the subscribers in the line group 21 to 20 is extended to the units relays at this time, only the units relay F2 is operated and the second line only of the selected group will be further extended. That is, with the operation of the units relay F2, the contacts 403, 406, 409 of inner bank 92, associated with relay F2, the contacts of which are associated with the line of the second subscriber of each group of ten, are brought into circuit-making relation with the contacts 402, 405, 408 of bank 93. Inasmuch as the F20 relay is the only operated tens relay at this time, only the second subscriber of the second group, i. e. line 22, will be connected through the line finder switch and over conductor 500, 501 and 502 at this time.

In this way the circuit of any calling line is automatically and instantaneously connected through the line finder switch 200 to the further exchange switching equipment. It is apparent from the foregoing description that an extreme saving in space requirements as well as a minimization of structural cost may be effected with utilization of the novel multiple armature relays of the invention in a telephone exchange, without sacrificing in any way the operating speed and reliability of the switch. It is possible through the use of these relays to effect a space saving of approximately 50% and a proportional saving in installation and manufacturing costs for a single switch, which occupies the space of one conventional relay and yet performs the same operation which normally required two relay switches.

While there has been set forth heretofore a specific arrangement in which the new multiple-armature relays are of especial utility, other applications of the relays in other switches of the automatic exchange and in other industrial fields will be apparent to parties skilled in the art. For example, when the twin-armature type relays are also used as guard relays in the line finder switch, a still further saving in space and cost is effected. The line circuits of a telephone system also lend themselves to the use of twin armature relays, the use of same as a cut-off relay therein effectively reducing the relays required from three to two relays per line, whereby a further saving in space and cost requirements is provided.

Connector switches of an all relay exchange conventionally use tens and units relays in connecting the calling line to the called line, and accordingly similar savings and advantages therein may be effected with the use of the novel twin-armature relays of the invention. Further applications include use of the relays in the switch counting chain arrangements, the battery feed systems and at many other vital control points of an automatic telephone system.

The use of the novel relays in other industrial fields is also believed to be clearly taught by the foregoing specific disclosure. These and other specific features of the invention which are believed to be new are set forth in the accompanying claims.

What is claimed is:

1. In a switch structure, a plurality of electromagnetic coil members, means for selectively connecting each of said coils to a source of electrical energy, a common electromagnetic core member for mounting said coils, a plurality of magnetically attractable armatures associated with said coil members, each being pivotally mounted for magnetic attraction with selective energization of its associated coil member, contact elements mounted in a plurality of spaced banks arranged in tiers, and contact operating means associated with each of said armatures for bringing the contacts of a preassigned pair of said tiers into contact-making relation with energization of its associated coil different armatures being assigned to control the operation of the contacts of different pairs of tiers.

2. In a switch structure, a plurality of electromagnetic coil members, means for selectively connecting each of said coils to a source of electrical energy, a plurality of magnetically attractable armatures, each being pivotally mounted for independent actuation between several positions by an associate one of said electromagnetic coil members, contact elements mounted in a plurality of spaced banks, and contact operating means associated with each of said armatures to operate the contacts of a preassigned pair of said banks into contact-making relation, different armatures being assigned to control the operation of the contacts of different pairs of banks, one of said banks on said switch being mounted for motion as one of the banks of each pair of banks on said switch.

3. In a switch structure a pair of electromagnetic coil members, means for selectively connecting each of said coils to a source of electrical energy for effecting selective energizing of each coil, a pair of magnetically attractable armatures, each being pivotally mounted for magnetic attraction by only a preassigned one of said electromagnetic coil members, contact elements mounted in a plurality of spaced banks, and contact operating means associated with each of said armatures to operate the contacts of a preassigned pair of said banks into contact-making relation, different armatures being assigned to control the operation of the contacts of different pairs of banks, one of said banks being mounted for movement between several positions to effect completion of circuits connected thereto alternatively over a second one or a third one of said plurality of banks.

4. In a switch structure, a pair of electromagnetic coil members, means for selectively connecting each of said coils to a source of electrical energy for energization of each coil independent of the condition of the other coils, a pair of magnetically attractable armatures, each being pivotally mounted for magnetic attraction by said electromagnetic coil members, contact elements mounted in a plurality of spaced banks, and contact operating means associated with each of said armatures to operate the contacts of a preassigned pair of said banks into contact-making relation, one of said banks being mounted common to each of the other of said banks for individual engagement thereby, the circuits carried by one of said banks being completed over said common bank responsive to energization of the one coil member, and the circuits carried by the other of said banks being completed over said common bank responsive to the energization of the other of said coil members.

5. In a switch structure, a pair of electromagnetic coils including means for selectively connecting each of said coils to a source of electrical energy for effecting selective energization of each coil, a common electromagnetic core member for mounting said coils, a pair of magnetically attractable armatures pivotally mounted for magnetic attraction by said electromagnetic core member, contact elements mounted in three substantially parallel spaced banks, and contact operating means associated with each of said armatures to operate the contacts of a preassigned pair of said banks into contact-making relation, one of said banks being mounted intermediate said second and third banks for contact with said second bank responsive to operation of one of said armatures and for contact with said third bank responsive to operation of the other of said armatures.

6. In an all-relay automatic telephone exchange, a line finder switch comprising, a plurality of group relay switches and a units relay switch, each of said group relays comprising a plurality of electromagnetic coil members including means for independently connecting each of said coils to a source of electrical energy, a plurality of magnetically attractable armatures, each of which is pivotally mounted for magnetic attraction by an associate one of said electromagnetic coil members, contact elements mounted in a plurality of spaced banks, means for connecting the line circuits of a first preassigned group of subscribers to the contacts of one of its banks, means for connecting the line circuits of a second preassigned group of subscribers to a second one of its banks, conductor means for connecting the contacts of a third one of its banks to the contacts of said units switch, and contact-operating means associated with each of said armatures for independently operating the contacts of said first and second banks at different times into contact-making relation with said third bank on said relay switch.

7. In an all-relay automatic telephone exchange, a line finder switch comprising five group relay switches and a units relay switch, each of said group relays comprising a plurality of electromagnetic coil members including means for independently connecting each of said coils to a source of electrical energy, a plurality of magnetically attractable armatures, each of which is pivotally mounted for magnetic attraction by an associate one of said electromagnetic coil members, contact elements mounted in a plurality of spaced banks, means for connecting the line circuits of a first group of ten subscribers to the contacts of one of said banks, means for connecting the lines of a second group of ten subscribers to a second one of said banks, conductor means for connecting the contacts of a third one of said banks to the contacts of said units switch, and contact-operating means associated with each of said armatures, one of said contact-operating means being mounted to operate the contacts of said first bank into circuit-making relation with said third bank on the switch responsive to movement of its associated armature, and the other of said contact-operating means being mounted to operate the contacts of said third bank into circuit making relation with said second bank on the switch responsive to movement of its associated armature.

8. In an automatic telephone exchange of the all relay type, a line finder switch comprising a group of five "tens" relay switches and a units relay switch, each of said tens relays comprising a plurality of electromagnetic coil members including means for independently connecting each of said coils to a source of electrical energy, a plurality of magnetically attractable armatures, each of which is pivotally mounted for magnetic attraction by an associate one of said electromagnetic coil members, contact elements mounted in substantially parallel spaced inner, intermediate and outer banks, means for connecting the line circuits of a first group of ten subscribers to the contacts of the inner one of said banks, means for connecting the lines of a second group of ten subscribers to the outer one of said banks, means for connecting the contacts of the intermediate one of said banks to said units switch, and contact-operating means associated with each of said armatures for operating the contacts of said banks to alternatively bring the contacts of said inner or said outer bank into circuit-making relation with said intermediate bank on said switch with operation of the corresponding one of the relay coils.

9. In an automatic telephone exchange of the all relay type, a line finder switch comprising a plurality of group relays and a units switch comprising a plurality of electromagnetic coil pairs, each pair being mounted coaxially in tandem relation, means for independently connecting each of said coils of each pair to a source of electrical energy, a plurality of magnetically attractable armatures, each being pivotally mounted for magnetic attraction by an associate one of said electromagnetic coil pairs, contact elements mounted in a plurality of groups of spaced banks, each group of banks being individual to a pair of said coils and operatively controlled by an associated pair of said armatures, means for connecting the line of a first one of ten subscribers to the contacts of one of said banks of a group, means for connecting the line of a second one of ten subscribers to a second one of said banks of said group, means for connecting a third one of said banks of said group to further switching equipment, and contact-operating means associated with the armatures for a group for alternatively operating said first and third or said second and third banks into circuit-making relation.

10. A line finder switch as set forth in claim 9 which includes five bank groups, controlled by five coil pairs, the one bank of each group being connected to the contacts of a predetermined even numbered subscriber of each group of ten and the other bank of each group being connected to an odd numbered subscriber of each group of ten.

11. A line finder switch as set forth in claim 9 in which each coil is connected as a units relay and the bank of contacts in its associated group which are controlled thereby are connected to the corresponding subscriber lines of each group of ten subscribers.

12. In an all relay automatic telephone exchange, a line finder switch comprising a group of five "tens" switches for controlling selection of line groups and a units switch for selecting a line of a group, each of said tens switches comprising a pair of electromagnetic coil members including means for independently connecting each of said coils to a source of electrical energy, a pair of magnetically attractable armatures, each being pivotally mounted for magnetic attraction by an associate one of said electromagnetic coil members, contact elements mounted in three spaced banks, means for connecting the lines of a first group of ten subscribers to the contacts of one of said banks of one tens switch, means for connecting the lines of a second group of ten subscribers to a second one of said one tens switch banks, means for connecting a third bank of said one tens switch for control by said units switch, and contact operating means associated with each of said armatures to operate the contacts of said first and second banks into contact making relation with said third bank on said one switch; each of said tens switches having their associate banks thus connected to control two groups of ten subscribers for extension to said units switch; said units switch comprising ten electromagnetic coils arranged in five pairs, each pair having a common core means for connecting each coil independently to a source of electrical energy, a pair of magnetically attractable armatures for each coil pair, each being pivotally mounted for magnetic attraction by an associate coil of its associate pair, contact elements for each coil pair mounted in three spaced banks, means for connecting the line of the first one of each group of ten subscribers controlled by each tens relay coil to the contacts of one of the banks of a unit coil pair, and a second line of each group of ten subscribers to the contacts of the second bank of said unit coil pair, each coil pair in said switch being connected to control two different subscribers of each group of ten, and contact operating means associated with each armature for each units coil for alternatively operating its first and third banks or its second and third banks into circuit-making relation.

13. In a switch structure of the class described, a supporting frame plate, an armature member, support means for mounting said armature on said plate in physically unattached relation therewith, a plurality of contact reed elements mounted in insulated spaced relation adjacent one face of said plate and spaced outwardly of said armature member, said reed elements being divided into spaced banks arranged in tiers disposed substantially parallel to said plate, with the several banks thereof being insulated from one another, an insulating comb-block carried by said armature for loosely receiving the reeds of the one of said tiers closest thereto between the teeth of the comb, and electromagnetic means, carried by said plate, for periodically biasing said armature arcuately away from said plate to move said tier of reed elements received by said insulating comb-block thereon into contact with the next adjacent tier of reeds when said electromagnetic means is energized.

14. In a switch structure of the class described, a support plate, a pair of electromagnetic coils adapted for connection to a source of electrical energy for periodic independent energization thereby, an electromagnet core member commonly mounting the said coils coaxially in tandem relation, a pair of magnetically attractable armatures each having transversely related platform and arm portions pivotally mounted on said plate, the platform portion of each of said armatures overhanging one end of the said electromagnetic core member for magnetic attraction thereto, a plurality of contact reed elements arranged in substantially parallel spaced tiered relation outwardly of said plate and armature arm portions, and insulating comb-block means at the free end of each of said armatures engageable with the elements of one of said tiers thereof for biasing the upper end of the reeds of said one tier into circuit closing contact with the adjacent ends of an adjacent tier of reeds when either of said armatures is magnetically attracted to said core member.

15. A switch assembly of the class described, comprising in combination, a pair of electromagnets mounted on a common core, a pair of magnetically attractable armatures, each having transversely related arm and platform portions pivotally mounted adjacent said electromagnets for magnetic attraction thereto, a plurality of cantilever mounted contact reeds positioned adjacent the arm portions of said armatures, said reeds being arranged in insulated substantially parallel spaced inner, intermediate and outer banks, and a first connective means connected between one of said armature's arm portion and said inner bank of reeds for moving said inner bank of reeds into contact with said intermediate bank of reeds responsive to energization of one of said electromagnets, and a second connective means for moving said intermediate bank of reeds into contact with the said outer bank of reeds in response to energization of the other of said two electromagnets.

16. A switch of the class described, comprising in combination, a support plate, a pair of electromagnetic coils mounted coaxially about a common core and positioned adjacent one face of said plate, a pair of magnetic armatures mounted pivotally on said plate, each armature having transversely related arm and platform portions with the said platform portion thereof traversing said plate and overhanging one end of said electromagnetic core member for magnetic attraction thereto, the arm portions of each of said armatures being disposed adjacent the opposite face of said plate from said coils and adapted to move arcuately outward therefrom in response to magnetically induced movement of its related platform portion toward said core, insulating block members mounted across the arcuately movable end of each of said armature arm portions, and three insulated and separated banks of contact reed members arranged in tiers disposed in parallel spaced relation adjacent said block members and outwardly of said armature arm portions and plate, said block members each engaging the contact reeds of separate tiers thereof to resiliently bend the tiers of reeds so engaged by said block members into contacting relation with an adjacent tier of reeds when the said armature arm portions are moved arcuately outward from said plate during electrical energization of said coils as selected.

17. In a switch structure, a plurality of pairs of electromagnetic coils, each pair of coils being mounted on a core common to the coil pair, means for connecting each coil to a source of electrical energy; a plurality of magnetically attractable armatures, each armature being pivotally mounted for magnetic attraction by an associate one of said electromagnetic coils; contact elements mounted in a plurality of groups of spaced banks, the contacts in each group of banks being arranged in tiers, each group being individual to a pair of said coils and operatively controlled by an associated pair of said armatures, a first contact operating means for each group of banks operatively controlled by one of the armatures for the group to effect engagement of the contacts of a first tier and a second tier of its associated group, and a second contact operating means controlled by the other of said armatures for the group for effecting engagement of the contacts of the second tier with the contacts of the third tier of its associated group.

18. In a switch structure of the class described, a support plate, a plurality of pairs of electromagnetic coils adapted for connection to a source of electrical energy for periodic independent energization thereby, an electromagnet core member commonly mounting each pair of coils thereon, a pair of magnetically attractable armatures for each coil pair, each having a transversely related platform and arm portion pivotally mounted on said plate, said platform portion of each of said armatures overhanging one end of the associated common electromagnetic core member for magnetic attraction thereby, a plurality of contact reed elements arranged in tiers for each coil pair arranged in substantially parallel-spaced banked relation outwardly of said plate and armature arm portions, and insulating means associated with each coil pair at the free end of each of said armatures engageable with the elements of one of said tiers thereof for biasing the upper end of the associated reeds of said one tier into circuit closing contact with the adjacent end of an adjacent tier of reeds when either of said armatures is magnetically attracted to said core member.

19. In a switch structure, a plurality of electromagnetic coil members, means for connecting each of said coil members to a source of electrical energy, a plurality of magnetic attractable armatures, each being pivotally mounted for magnetic attraction with energization of an associated coil member, contact elements mounted in a plurality of spaced banks which are arranged in tiers, one of said banks being mounted common to each of the other of said banks of said tiers, means operative responsive to energization of one of said coils to move the contact elements in one of said banks into engagement with the contact elements in said common bank, and means operative with energization of the other of said coils to move the contact elements in said common bank into engagement with the contact elements of a bank in said tier other than said one bank.

20. An arrangement as set forth in claim 19 in which said arrangement includes means for supporting the contact elements of said common bank for movement out of engagement with the contact elements of said first bank and into engagement with the contact elements of said other bank whenever both coils are energized simultaneously.

21. An arrangement as set forth in claim 1 which includes means for supporting each of the contact elements of said banks in such manner that the contact elements, as moved into engagement with each other, are operated in a contact follow manner.

References Cited in the file of this patent

UNITED STATES PATENTS

| | | |
|---|---|---|
| 1,075,007 | Blessing | Oct. 7, 1913 |
| 1,189,891 | Webster | July 4, 1916 |
| 2,137,503 | Obergfell | Nov. 22, 1938 |
| 2,137,514 | Voss | Nov. 22, 1938 |
| 2,416,131 | Voss | Feb. 18, 1947 |
| 2,472,428 | Jones | June 7, 1949 |
| 2,519,849 | Ostline | Aug. 22, 1950 |

FOREIGN PATENTS

| | | |
|---|---|---|
| 302,107 | Great Britain | Dec. 13, 1928 |